United States Patent Office 3,313,823
Patented Apr. 11, 1967

3,313,823
1-HYDROXY-4-BENZOTHIAZOLYLAMINO ANTHRAQUINONE
André Albert Paul Simonnet, Creil, Oise, and Louis Antoine Cabut, Nogent-sur-Oise, Oise, France, assignors to Etablissements Kuhlmann, Paris, France
No Drawing. Filed Oct. 1, 1963, Ser. No. 312,853
Claims priority, application France, Oct. 3, 1962, 911,162
1 Claim. (Cl. 260—303)

The present invention concerns new dyestuffs for synthetic fibres.

According to the present invention new violet dyestuffs are provided of the general formula:

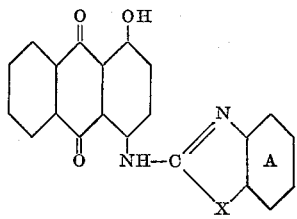

in which X represents an oxygen or sulphur atom or an imino group and the benzene nucleus A may be substituted by at least one non-water solubilising substituent such as halogen atoms, alkyl, nitro or amino groups.

The new dyestuffs of this invention may be prepared for example by reacting 1-hydroxy-4-amino-anthraquinone with a 2-halo-benzoxazole, 2-halo-benzothiazole or 2-halo-benzimidazole. The reaction may be carried out in the presence of an organic solvent; it goes very easily in phenol at temperatures between 80° C. and 160° C. and more especially between 100° C. and 140° C.

The dyestuffs according to the invention, previously dispersed, are particularly suitable for the dyeing and printing of synthetic fibres, especially fibres based on polyesters. By "fibres based on polyesters" are meant generally the fibres obtained by the polycondensation of diacids with dialcohols, for example by the polycondensation of terephthalic acid with ethylene glycol. Such fibres are known on the market by the names of "Dacron," "Tergal" and "Terylene." By means of the dyestuffs of this invention they are dyed red-violet shades which are very fast to light and to sublimation.

In the following examples which are purely illustrative and to which the invention is not limited, the parts mentioned are parts by weight.

Example 1

4.8 parts of 1-hydroxy-4-amino-anthraquinone and 3.6 parts of 2-chloro-benzothiazole are added to 40 parts of melted phenol and the mixture is stirred for 22 hours at 100° C. After cooling to 70° C., 500 parts of ethyl alcohol are added. The precipitate obtained is filtered off, washed with boiling ethyl alcohol until the filtrate is colourless, drained and dried. 6.75 parts of a red-violet powder containing 7.16% of nitrogen and 7.91% of sulphur (calculated for $C_{21}H_{12}N_2O_3S$: N 7.53% and S 8.6%) are thus obtained. This product, after treatment in the presence of a dispersing agent, dyes "Tergal" a bright red-violet shade, which is very fast to light and to sublimation.

Example 2

If the 3.6 parts of 2-chloro-benzothiazole in Example 1 are replaced by 3.4 parts of 2-chlorobenzoxazole, 2.2 parts of a violet powder are obtained which dyes "Tergal" a red-violet shade which is very fast to light and to sublimation.

Example 3

If the 3.6 parts of 2-chloro-benzothiazole in Example 2 are replaced by 4.6 parts of 2-chloro-6-nitro benzothiazole a dyestuff having similar properties is obtained.

We claim:
The dyestuff of the formula:

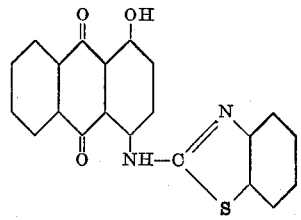

References Cited by the Examiner
FOREIGN PATENTS
348,494 10/1960 Switzerland.
358,533 1/1962 Switzerland.

ALEX MAZEL, *Primary Examiner.*
ALTON D. ROLLINS, *Assistant Examiner.*